Jan. 9, 1934. C. F. HIGGINS Re. 19,042
DUMPING VEHICLE
Original Filed April 3, 1925 2 Sheets-Sheet 1
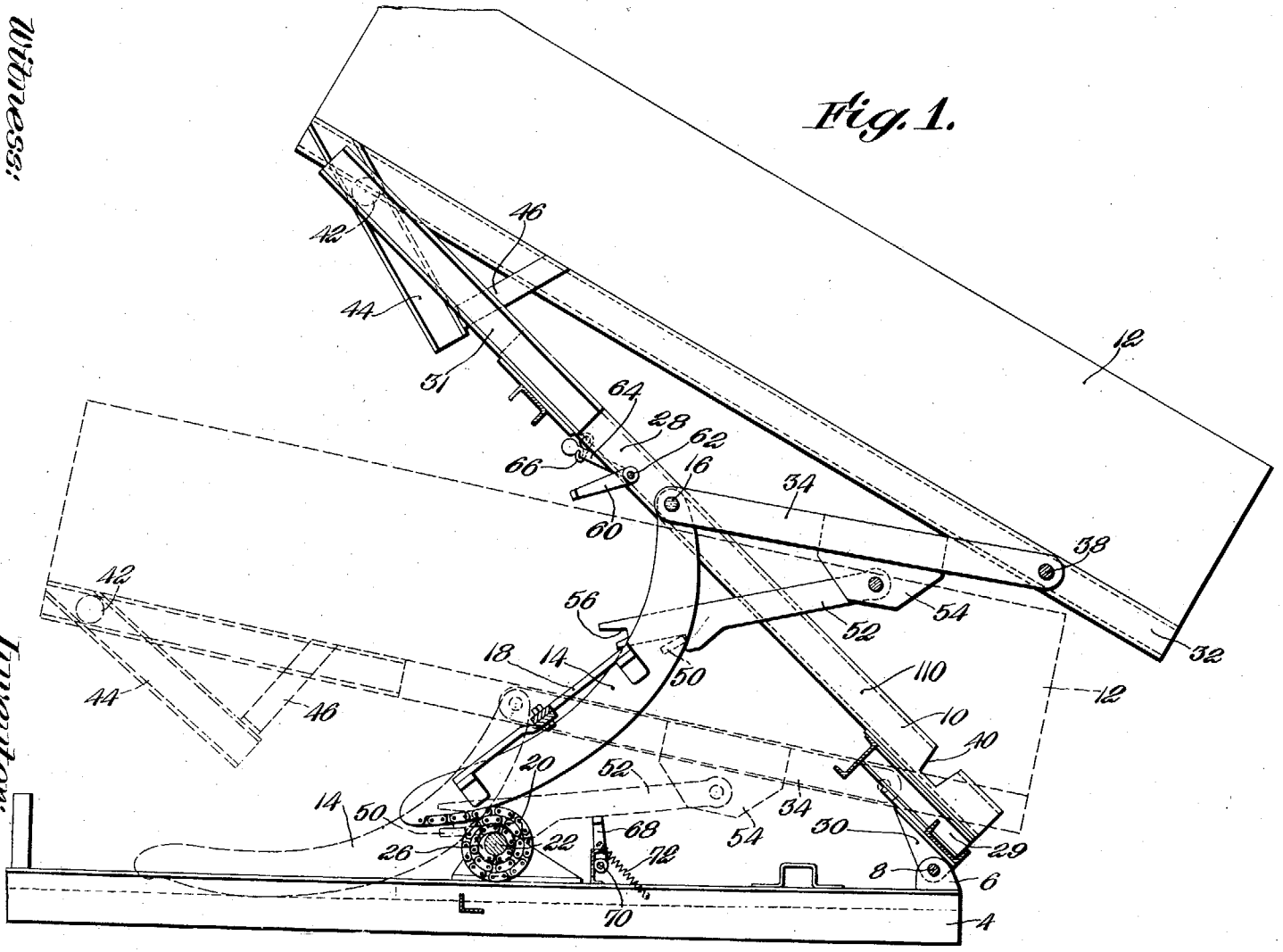
Witness:
Alfred H. McGlinchey.
Inventor:
Clark F. Higgins
by Van Evern Fish
Thilenius Heavy Attys Jan. 9, 1934. C. F. HIGGINS Re. 19,042
DUMPING VEHICLE
Original Filed April 3, 1925 2 Sheets-Sheet 2
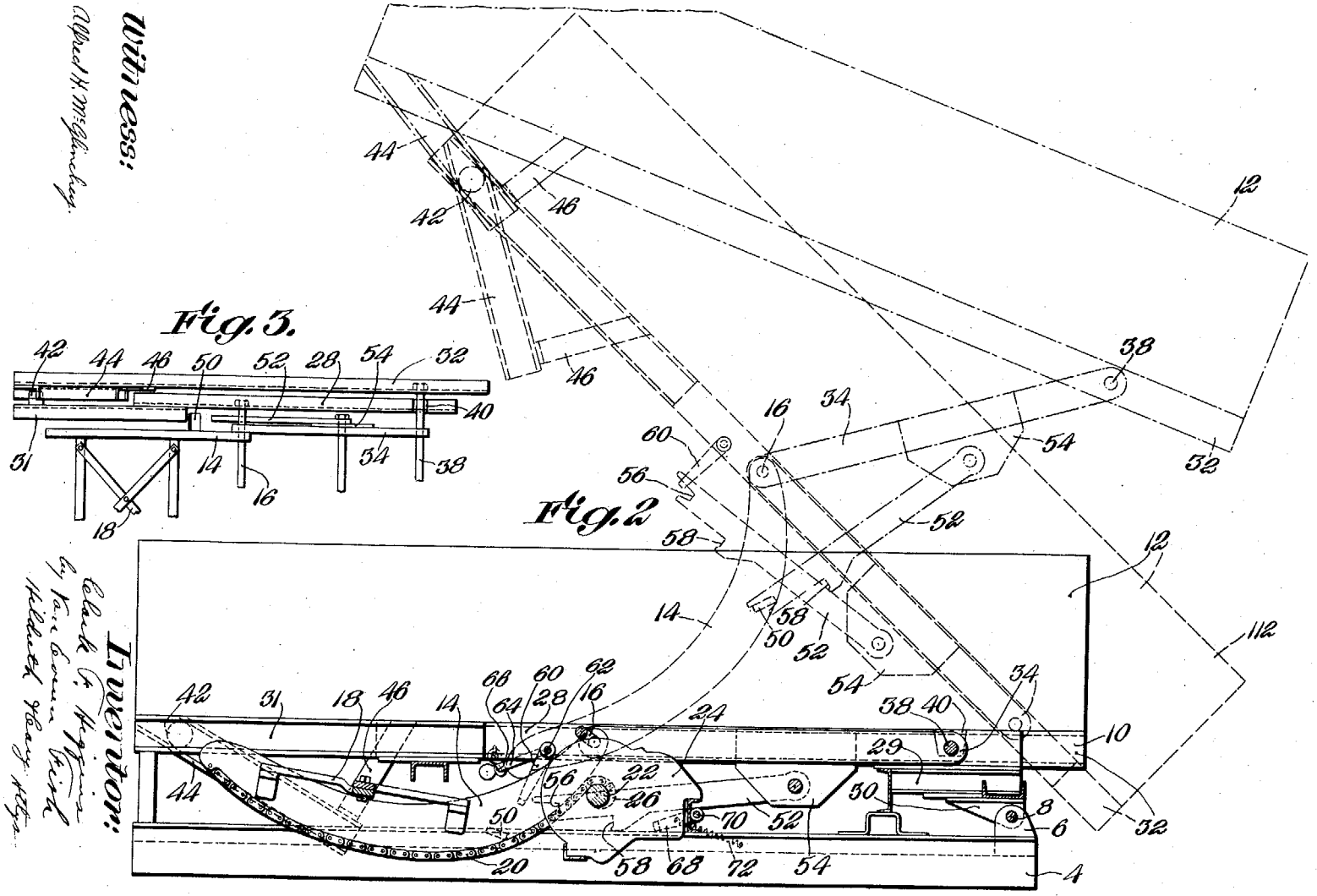
Witness:
Alfred H. McGlinchey.
Inventor:
Clark F. Higgins
by Van Cleave Fish
Hildreth & Leary Attys.

Reissued Jan. 9, 1934

Re. 19,042

UNITED STATES PATENT OFFICE 19,042

DUMPING VEHICLE

Clark F. Higgins, Melrose, Mass., assignor, by mesne assignments, to General Body & Hoist Company, Everett, Mass., a corporation of Massachusetts Original No. 1,766,436, dated June 24, 1930, Serial No. 20,380, April 3, 1925. Application for reissue May 27, 1932. Serial No. 613,968

8 Claims. (Cl. 298—11)

The present invention relates to dumping vehicles and more particularly to elevating or hoisting mechanisms for dumping vehicles.

The object of the present invention is to reorganize and improve the construction of dumping vehicles with a view of obtaining efficient dumping operation under all conditions, especially when the body of the vehicle is to be raised to a high hoist position and to obtain a better angle of dump in the high lift position than would be possible under previously used method.

With this object in view the present invention consists in the dumping vehicle hereinafter described and particularly defined in the claims.

In the accompanying drawings Figure 1 is a central sectional longitudinal elevation of the body and hoisting mechanism of the improved dumping vehicle; Figure 2 is a view similar to Figure 1 showing the parts in different positions; and Figure 3 is a plan view of one side of the body supporting and hoisting structure.

The illustrated embodiment of the invention comprises a bed or foundation 4 adapted to be mounted on the chassis of the vehicle and provided at its rear end with ears 6 receiving a shaft 8 on which is pivoted a pair of body supporting members or side arms 10 at opposite sides of the vehicle, only one of which is shown in the drawings. The body supporting members 10 carry the body 12 in a manner presently to be described in detail. Connected with each of the body supporting members 10 is a curved hoist arm 14, which is pivoted at one end upon a shaft 16 extending across the vehicle between the supporting members 10. The two hoist arms at opposite sides of the vehicle are connected together and braced by diagonal cross pieces 18. Attached to the free end of each hoist arm 14 is a flat link chain 20, which engages with and conforms to the convex under surface of the hoist arm for the major portion of its length, the chain being connected at its other end to a winding shaft 22 adapted to be rotated by suitable gearing contained in a transmission casing 24 and connected with the transmission of the vehicle in any usual or preferred manner. Upon rotation of the shaft the chain, being flat, is adapted to wind spirally on itself, as shown in Figure 1, the connection of the chain to the shaft being made through a lug 26 on the shaft, which has a spiral surface of such form as to support the chain during the winding operation. It will be seen that the chain by its engagement with the under surface of the hoist arm serves not only to exert a tension at the outer end of the hoist arm, but also by its supporting action to exert an upward thrust to the arm, which assists in the initial elevation of the body, and moreover by virtue of the spiral winding of the flat chains upon the shaft a uniform winding of each chain and a consequent uniform tension on each of the hoist arms are assured.

Proceeding now to the mounting of the body upon the vehicle, it will be seen that each body supporting member 10 comprises a channel iron 28 mounted on an I-beam 29, to which is attached an ear 30 for pivotal connection on the shaft 8. Secured at the forward end of the channel 28 is a second channel iron 31 which is riveted to the channel 28 and faces in the opposite direction therefrom. The body 12 comprises a box-shaped structure of the usual form mounted on channel irons 32 at opposite sides of the vehicle. The body and body supporting members are connected at each side of the vehicle by a bar 34 pivoted at one end upon the shaft 16 and at the other end upon a shaft 38 which extends between the channels 32 of the body across the vehicle and which rests in a recess 40 in each of the body supporting members when the body is in horizontal or rear dump position. At the front end, each body supporting member is pivotally connected with the body through a pin 42 attached to the channel iron 31 received in an inclined slideway 44 comprising a channel secured at one end to the body and supported at the other end by a bracket 46 also attached to the body.

Upon rotation of the shaft 22 the hoist arm is actuated to elevate the body supporting members to the position 110 shown in full lines in Figure 1, the body at this time being normally carried along with it as a unit to the rear dump position indicated at 112 in Figure 2. Provision is made for causing relative movement between the body and the body supporting members to elevate the rear end of the former during the hoisting operation if desired. For this purpose each hoist arm 14 is provided with a projection 50 adapted to be engaged by a thrust member 52 pivoted upon a block 54 which is secured to the bar 34. The thrust member 52 has a notch 56 in its forward end and a rear notch 58 in a projection formed intermediate to its ends. The operation of the thrust member will be apparent from Figures 1 and 2. When the thrust member is maintained entirely out of engagement with the projection 50 of the hoist arm, the body and body supporting members are moved together as a unit about the pivot 8 into rear dump position 112. When the thrust member is set so that the projection 50 engages in the intermediate notch 58, the rear end of the body is moved relatively to the body supporting members, the body turning on its front end pivotal connection formed by the pin 42 in the slideway 44, while the body supporting members are moved to the same position as before by the hoist arm. If the thrust member is arranged so that when the projection 50 engages in the forward notch 56, the body is raised to a still higher position; namely, the high hoist position indicated in dot- and dash lines in Figure 2. It will be seen that in the intermediate and high hoist positions there occurs a relative longitudinal movement between the body supporting members and the body by virtue of the rigid connection of the bar 34. This causes a sliding of the pin 42 in the slideway 44, which through the inclination of the slideway necessarily elevates the front end of the body, thus giving a considerable increase in the inclination of the body for dumping in these positions. Provision is made for setting the thrust member prior to the hoisting operation, in order that it may be held entirely out of engagement with the projection 50 or caused to have selective engagement therewith in either the notch 56 or the notch 58. For this purpose each thrust member is normally held up out of the path of movement of the projection 50 of the hoist arm by means of a latch 60 adapted to engage with the notched forward end of its corresponding thrust member, the two latches being secured to a rock shaft 62 journaled in the body supporting members 10 at opposite sides of the vehicle. A weighted arm 64 secured to the rock shaft 62 at one end normally retains the latch in position to engage the thrust member, and a hook 66 is provided by which the latch may be held in a position out of engagement with the thrust member when the arm 64 is manually lifted. In this latter case the thrust member tends to drop into a position to be engaged by the projection 50 of the hoist arm in either of the notches 56 or 58 as determined by a positioning latch 68, provided for each thrust member upon a rock shaft 70 extending across the vehicle. Each latch is held either in depressed position against the foundation 4, as shown in Figure 2, in order to permit engagement of the projection 50 in the forward notch of the thrust member, or in the elevated position, as shown in Figure 1, against a suitable stop (not shown) for lifting the thrust member in position to receive the projection 50 in the rear notch 58 to raise the body to intermediate position. Connected between each latch 68 and the foundation 4 is a tension spring acting off center from the axis of the rock shaft 70 to hold the latch in either of the positions to which it may be moved. By this construction both latches may be moved from one position to the other by manually turning either one of them.

It will be seen that by the provision of the thrust member for selective engagement with the hoisting arms a convenient means is provided for determining the elevation to which the body may be raised. The hoisting mechanism consisting of the hoist arms and their cooperating chains is simple and rugged in construction. The particular type of chain employed constittues a flexible winding member which supports its corresponding hoist arm both when the body is in carrying position and when it is being elevated, the provision for uniform winding of the chains on the shaft insuring uniform lifting stresses on both sides of the vehicle.

Having thus described the invention, what is claimed is:

1. A dumping vehicle having, in combination, body supporting members pivoted at the rear end of the vehicle, a body connected at its front end with the body supporting members, hoist arms for elevating the body supporting members about their pivots, thrust members connected with the body and having provision for selective engagement at different positions with the hoist arms to elevate the rear end of the body to different heights relatively to the body supporting members, and means for holding the thrust members in position out of engagement with the hoist arms to permit the body to be raised to rear dump position.

2. A dumping vehicle having, in combination, body supporting members pivoted on the rear end of the vehicle, a body connected with the body supporting members, hoist arms for elevating the body supporting members, thrust members connected with the body, each having a plurality of notches for engagement with the hoist arms to elevate the rear end of the body relatively to the body supporting members, a latch for normally holding the thrust members out of engagement with the hoist arms, and a second latch for presenting the thrust members selectively into positions for engagement of the hoist arms with one of the series of notches to determine the elevation of the body.

3. A dumping vehicle having, in combination, body supporting members pivoted at the rear end of the vehicle, means for supporting a body on said members for longitudinal movement thereon and for pivotal movement to raise its rear end from said members, and inclined guiding means connecting the front end of the body and said members acting to raise the front end of the body from said members during said longitudinal movement.

4. A dumping vehicle having, in combination, body supporting members pivoted at the rear end of the vehicle, means for supporting the body on said members for longitudinal movement thereon and for pivotal movement to raise its rear end in relation to said members, inclined guides on the body and pivot pins on said members having a sliding engagement with said guides and cooperating with said guides during said longitudinal movement to raise the front end of the body from said members.

5. A dumping vehicle having, in combination, a body, means for lifting the body to a position in which both its rear and front ends are elevated, members between which and the body there is a relative longitudinal movement as the body is elevated to said position, and inclined guideways connecting the front end of the body and said members acting to raise the front end of the body with relation to said members during such relative longitudinal movement.

6. A dumping vehicle having, in combination, a body, means for lifting the body to a position in which both its rear and front ends are elevated, members between which and the body there is a relative longitudinal movement as the body is elevated to said position, inclined guides on the body, and pins on said members having sliding engagement with said guides and cooperating therewith to raise the front end of the body with relation to said members during such relative longitudinal movement.

7. A dumping vehicle having, in combination, body-supporting members pivoted at the rear end of the vehicle, hoist arms for elevating the body-supporting members about their pivots, thrust members connected with the body having provision for selective engagement at different positions with the hoist arms to elevate the rear end of the body to different heights relatively to the body-supporting members, inclined guiding means connecting the front end of the body and said hoist members, and acting to raise the front end of the body from said members during longitudinal movement of the body relatively to said hoist members.

8. A dumping vehicle having, in combination, body-supporting members pivoted at the rear end of the vehicle, hoist arms for elevating the body-supporting members about their pivots, thrust members connected with the body having provision for selective engagement at different positions with the hoist arms to elevate the rear end of the body to different heights relatively to the body-supporting members, inclined guiding means connecting the front end of the body and said hoist members, and acting to raise the front end of the body from said members during longitudinal movement of the body relatively to said hoist members, and means for holding the thrust members in position out of engagement with the hoist arms to permit the body to be raised to rear-dump position.

CLARK F. HIGGINS.